United States Patent
Richter

(10) Patent No.: US 11,510,032 B2
(45) Date of Patent: Nov. 22, 2022

(54) MOBILE TERMINAL, SUBGROUP OF MOBILE TERMINALS, AND METHOD FOR SETTING UP A COMMUNICATION GROUP IN A DIRECT MODE

(71) Applicant: Peiker Holding GmbH, Bad Homburg (DE)

(72) Inventor: Lutz Richter, Mixdorf (DE)

(73) Assignee: Peiker Holding GmbH, Bad Homburg (DE)

( * ) Notice: Subject to any disclaimer, the term of this patent is extended or adjusted under 35 U.S.C. 154(b) by 0 days.

(21) Appl. No.: 17/222,093

(22) Filed: Apr. 5, 2021

(65) Prior Publication Data

US 2021/0314740 A1  Oct. 7, 2021

(30) Foreign Application Priority Data

Apr. 6, 2020  (DE) .................... 10 2020 109 486.8

(51) Int. Cl.
| | |
|---|---|
| *H04W 4/10* | (2009.01) |
| *H04W 76/45* | (2018.01) |
| *H04M 1/72466* | (2021.01) |
| *H04M 1/02* | (2006.01) |
| *H04W 4/08* | (2009.01) |
| *H04W 88/06* | (2009.01) |

(52) U.S. Cl.
CPC ........... *H04W 4/10* (2013.01); *H04M 1/0254* (2013.01); *H04M 1/72466* (2021.01); *H04W 4/08* (2013.01); *H04W 76/45* (2018.02); *H04W 88/06* (2013.01); *H04M 2250/06* (2013.01)

(58) Field of Classification Search
CPC ......... H04W 4/10; H04W 4/08; H04W 88/06; H04W 76/45; H04M 1/72466; H04M 1/0254; H04M 2250/06
USPC ...................................................... 455/556.1
See application file for complete search history.

(56) References Cited

U.S. PATENT DOCUMENTS

| | | | | |
|---|---|---|---|---|
| 7,508,840 | B2* | 3/2009 | Delaney | ................ H04L 41/12 |
| | | | | 370/466 |
| 8,001,274 | B2* | 8/2011 | Srinivasan | .............. H04L 67/02 |
| | | | | 709/202 |
| 8,700,090 | B2* | 4/2014 | Llanos | .............. H04M 1/72409 |
| | | | | 455/420 |

(Continued)

FOREIGN PATENT DOCUMENTS

| | | | | |
|---|---|---|---|---|
| EP | | 1988724 A1 * | 11/2008 | ............ H04W 76/14 |
| EP | | 2 840 722 A2 | 2/2015 | |

(Continued)

OTHER PUBLICATIONS

European Search Report (Application No. 21166170.7) dated Jul. 19, 2021.

(Continued)

*Primary Examiner* — Hai V Nguyen
(74) *Attorney, Agent, or Firm* — Burr & Brown, PLLC

(57) ABSTRACT

The present invention relates to a mobile terminal which comprises a mobile telephone and an additional device. In this case, the additional device comprises a second communication module, wherein the second communication module is designed such that it enables, as a participant of a WLAN network, a wireless third communication connection to this WLAN network.

9 Claims, 2 Drawing Sheets

(56) References Cited

U.S. PATENT DOCUMENTS

| | | | | |
|---|---|---|---|---|
| 8,929,938 | B2* | 1/2015 | Koren | H04W 4/10 |
| | | | | 455/518 |
| 8,982,763 | B2* | 3/2015 | Ofir | H04W 4/10 |
| | | | | 370/312 |
| 8,995,923 | B2* | 3/2015 | Jabara | H04W 4/08 |
| | | | | 455/67.11 |
| 9,001,703 | B2* | 4/2015 | Kuehner | H04W 76/45 |
| | | | | 370/262 |
| 9,306,991 | B2* | 4/2016 | Agulnik | H04L 65/65 |
| 9,510,160 | B2* | 11/2016 | Agulnik | H04W 4/10 |
| 9,516,686 | B2* | 12/2016 | Barbieri | H04W 36/03 |
| 9,730,017 | B2* | 8/2017 | Belimpasakis | H04W 4/027 |
| 10,602,412 | B2* | 3/2020 | Milanese | H04W 36/12 |
| 10,645,562 | B2* | 5/2020 | Beyer, Jr. | H04M 1/72418 |
| 10,820,374 | B2* | 10/2020 | Piironen | H04W 88/16 |
| 2003/0119536 | A1* | 6/2003 | Hutchison | H04W 74/00 |
| | | | | 455/518 |
| 2005/0265256 | A1* | 12/2005 | Delaney | H04L 41/12 |
| | | | | 370/254 |
| 2008/0200208 | A1* | 8/2008 | Llanos | H04M 1/72409 |
| | | | | 455/557 |
| 2010/0293217 | A1* | 11/2010 | Srinivasan | H04L 67/04 |
| | | | | 709/202 |
| 2011/0201275 | A1* | 8/2011 | Jabara | H04W 4/08 |
| | | | | 455/41.2 |
| 2013/0337859 | A1 | 12/2013 | Patel et al. | |
| 2014/0233447 | A1* | 8/2014 | Ofir | H04W 76/45 |
| | | | | 370/312 |
| 2019/0289452 | A1* | 9/2019 | Beyer, Jr. | H04W 4/026 |
| 2019/0350050 | A1* | 11/2019 | Piironen | H04W 4/10 |
| 2021/0007162 | A1* | 1/2021 | Pöllänen | H04W 76/50 |

FOREIGN PATENT DOCUMENTS

| | | | | |
|---|---|---|---|---|
| WO | WO-2007093653 A1 * | 8/2007 | | H04W 76/14 |
| WO | 2009/052859 A1 | 4/2009 | | |

OTHER PUBLICATIONS

German Search Report (Application No. 10 2020 109 486.8) dated Dec. 7, 2020.

* cited by examiner

MOBILE TERMINAL, SUBGROUP OF MOBILE TERMINALS, AND METHOD FOR SETTING UP A COMMUNICATION GROUP IN A DIRECT MODE

This application claims the benefit under 35 USC § 119(a)-(d) of German Application No. 10 2020 109 486.8 filed Apr. 6, 2020, the entirety of which is incorporated herein by reference.

FIELD OF THE INVENTION

The present invention relates to a mobile terminal, to a group of mobile terminals and to a method for setting up a communication group in a direct mode.

BACKGROUND OF THE INVENTION

Authorities and organizations with security tasks have been using digital systems, for example, TETRA or P25, for communication for several years. The most important application for voice communication in these networks is push-to-talk (PTT), the possibility of group calls and voice communication in a group. These systems require their own fail-safe infrastructure. However, in terms of technology, they are only able to transmit voice and short messages. In the case of network failure or for activities of a subgroup, it is possible to carry out voice communication in a so-called direct mode between terminals of these systems. In this case, direct communication is carried out between the terminals within a radius of several hundred meters irrespective of the infrastructure. Transmission is carried out at a relatively low frequency of several hundred MHz, but the terminals have high transmission powers of approximately 1 W to 1.8 W.

On account of the demand for broadband data transmission, for example, for video transmissions from the place of use, LTE technology is being increasingly used, in which case this use is usually carried out in separate bands which are reserved for particular authorities and organizations. The relatively high transmission frequencies and the low transmission power of the LTE mobile telephones used of only approximately 0.2 W and the special protocol structure do not permit a practical direct mode for direct communication between the LTE mobile telephones in LTE networks.

Authorities and organizations have already used or tried LTE mobile telephones. These LTE mobile telephones are usually also equipped with a WLAN communication module which can be used for voice and data communication in the immediate vicinity of a WLAN hotspot or routers, but is not able, in its technical design, to set up a point-to-point connection between such modules over several hundred meters. A practical direct mode on the basis of the WLAN modules installed in a mobile telephone is not possible.

SUMMARY OF THE INVENTION

The object of the present invention is to propose a mobile terminal and a subgroup of mobile terminals and a method for setting up a communication group in a direct mode, which provide possibilities for practical group communication in a direct mode when using modern mobile radio networks, for example, an LTE network, and in the case of associated use of mobile telephones.

The mobile terminal according to the present invention comprises a mobile telephone and an additional device, wherein the additional device comprises a loudspeaker, a microphone and a push-to-talk button, wherein the mobile telephone comprises a first communication module, wherein the first communication module is designed such that a wireless first communication connection to at least one mobile radio network, in particular, an LTE network and/or a 5G network and/or a P25 network, is possible, wherein the mobile telephone comprises a second communication module, wherein the additional device comprises a first communication module, wherein the second communication module of the mobile telephone and the first communication module of the additional device are designed such that there is a second communication connection between the mobile telephone and the additional device, wherein this second communication connection is established in a wired or wireless manner, in particular, wherein the additional device comprises a second communication module, wherein the second communication module of the additional device is designed such that it enables, as a participant of a WLAN network, a wireless third communication connection to this WLAN network.

This makes it possible, in an LTE network not intended for this purpose, to conduct group communication in the so-called direct mode via the second communication module of the additional device, which is technically configured such that the ranges familiar from TETRA or P25 systems are achieved even for frequencies in the Gigahertz range and there is practicality.

The subgroup according to the present invention of mobile terminals comprises a first mobile terminal and at least one second mobile terminal, wherein each mobile terminal comprises a mobile telephone and an additional device, wherein each additional device comprises a loudspeaker, a microphone and a PTT button, wherein each mobile telephone comprises a first communication module, wherein the first communication module is designed such that a wireless first communication connection A to at least one mobile radio network, in particular an LTE network and/or a 5G network and/or a P25 network, is enabled, wherein each mobile telephone comprises a second communication module, wherein each additional device comprises a first communication module, wherein the second communication module of the mobile telephone and the first communication module of the additional device are designed such that there is a second communication connection B between the respective mobile telephone and the respective additional device, wherein this second communication connection is established in a wired or wireless manner, in particular, wherein each additional device comprises a second communication module, and wherein each second communication module of each additional device is designed such that it enables, as a participant of a WLAN network, a wireless third communication connection C in this WLAN network, wherein provision is made, in particular, for this to take place as group communication between more than two participants or as direct communication between two participants.

This makes it possible to conduct group communication in a so-called direct mode between two or more participants via the second communication modules of the additional devices irrespective of the mobile radio network.

Provision is also made for the second communication module of the additional device to be respectively designed such that it has routing capabilities and/or repeater capabilities and/or bridging capabilities. Data and voice can be directed and/or forwarded and/or transferred between the additional devices by virtue of such a configuration.

If a mobile telephone contains a WLAN communication module, provision is also made for this mobile telephone to be incorporated into the WLAN network by means of this WLAN communication module in such a manner that this mobile telephone participates, as a further participant, in established third communication without using an additional device having a first and a second communication module for this purpose. It is, therefore, possible to supplement the group of mobile terminals with at least one additional mobile telephone. Accordingly, it is possible without any problems to also include team members equipped only with a conventional mobile telephone in the subgroup. In this case, the ranges for team members using such mobile telephones are then determined by the performance of the respective WLAN modules.

In a method according to the present invention for setting up a communication group in a direct mode, into which a subgroup of mobile terminals from a group of mobile terminals is incorporated, a control center or the operations manager equipped with a mobile terminal provides for the respective mobile terminals to be assigned to a task-specific communication group formed by the subgroup. The method provides for the steps mentioned below:

generating a data set in one of the mobile terminals, wherein the data set comprises a network name, for example, "Service Set Identifier", abbreviated to SSID, for the WLAN network to be set up, and wherein the data set comprises specific data relating to use, such as, in particular, a use identifier, transmitting the data set to an operations center via the mobile radio network by means of the first communication module of the mobile telephone, transmitting network accession commands and the network name from the operations center to the first communication modules of the mobile telephones of the mobile terminals of the members of the subgroup defined by the use identifier, further transmitting the network accession commands and the network name to the respective first communication modules of the additional devices by means of the respective second communication modules of the mobile telephones, further transmitting the network accession commands and the network name from the respective first communication modules of the additional devices to the respective second communication modules of the additional devices, activating and establishing the respective second communication modules as participants of the WLAN network by means of the received network name, and participating in third communication in the WLAN network.

Such a method can be used to easily set up group communication for a subgroup in the direct mode.

Before participating in the third communication connection C in the WLAN network, provision is also made for participation of the mobile terminal to be confirmed within a time window by pressing a button. This ensures that a status message relating to a complete set-up of the subgroup can be generated and measures for completing the subgroup can be taken, if appropriate.

Provision is also made for group communication of a subgroup, which takes place in the WLAN network, to be transmitted to the operations center via at least one of the participating mobile terminals. This makes it possible to quickly take emergency measures if the subgroup as a whole gets into difficulties.

Provision is also made for an incoming call on one of the mobile telephones in the subgroup to be signaled in the WLAN network and, if this call is accepted for the subgroup, to be transmitted to the subgroup in such a manner that either a listen connection or a speak connection or a listen/speak connection is enabled for all participants in the subgroup. This makes it possible for information brought to the subgroup from the outside to be effectively distributed in the subgroup and for information to likewise be effectively retrieved from the subgroup.

Finally, provision is made for the subgroup to be expanded by at least one additional mobile telephone, wherein the additional mobile telephone comprises a WLAN communication module which is used to incorporate the additional mobile telephone into the WLAN network in such a manner that a wireless third communication connection to this WLAN network is activated and established for this additional mobile telephone as an additional participant of the WLAN network. This makes it possible without any problems to also include team members equipped only with a conventional mobile telephone in the subgroup.

If the first communication connection fails for one group member or for all group members, provision is likewise made for communication to be carried out directly only via the third communication connection C and for the second communication modules of the additional devices and, in particular, also the WLAN communication module of at least one possibly additional mobile telephone to be activated for this purpose. This makes it possible to partially compensate for failure of a mobile radio network.

In the sense of the present invention, a WLAN network is understood as meaning a wireless network which is designed, in particular, as an ad hoc network which comprises radio nodes and radio paths and is preferably designed as an autonomous ad hoc network and is independently set up and configured.

In the sense of the present invention, communication in a direct mode is understood as meaning communication in a WLAN network, in particular, a WLAN network without an access point.

DETAILED DESCRIPTION OF THE DRAWINGS

Figure 1:
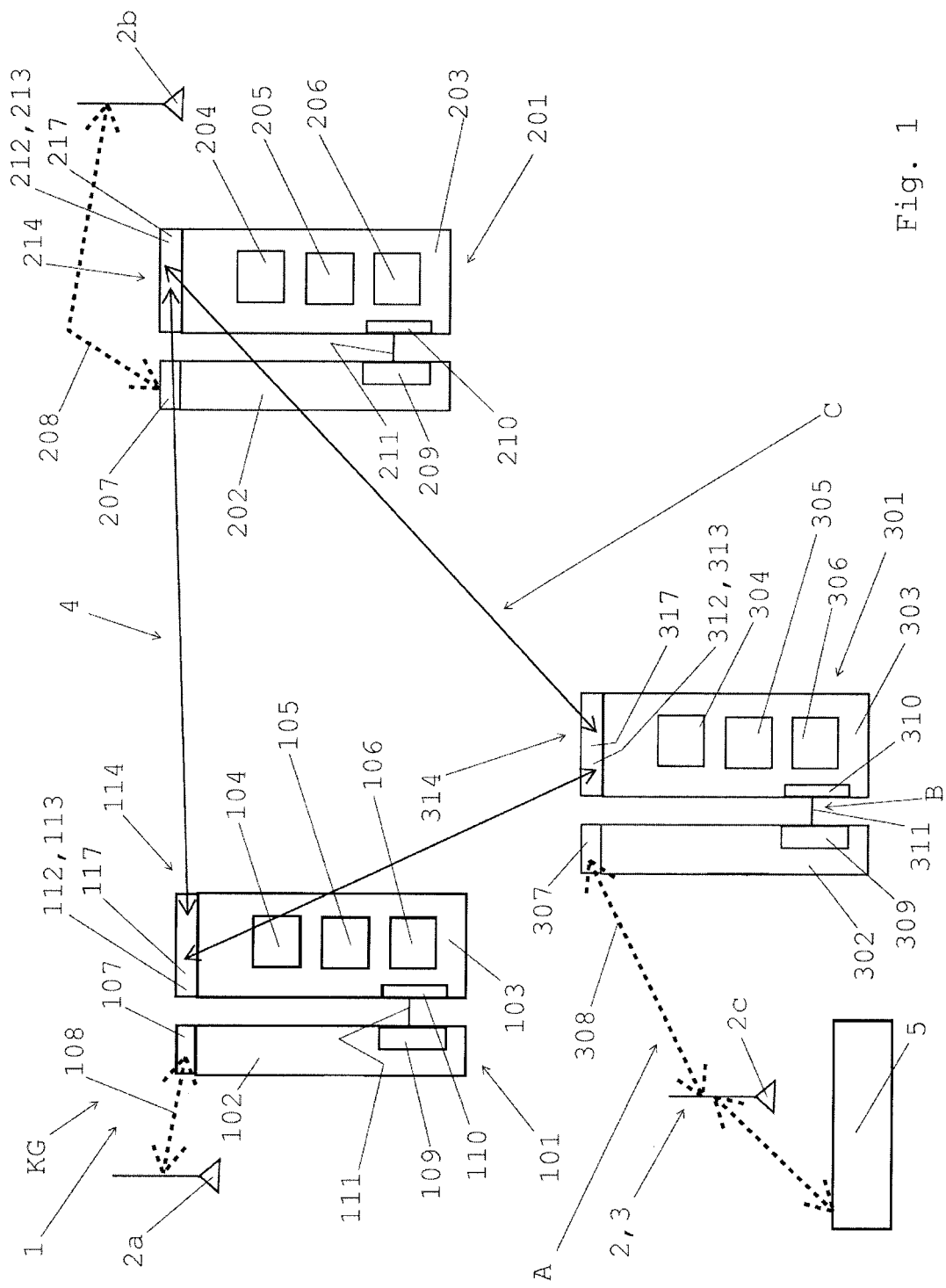
FIG. 1 shows a schematic illustration of a subgroup according to the invention of mobile terminals which comprises three mobile terminals according to the present invention.

FIG. 1 shows a schematic illustration of a subgroup 1 according to the present invention comprising three mobile terminals 101, 201, 301 according to the present invention. In this case, each mobile terminal 101, 201, 301 respectively comprises a mobile telephone 102, 202, 302 and an additional device 103, 203, 303. Each of the additional devices 103, 203, 303 in turn respectively comprises a loudspeaker 104, 204, 304, a microphone 105, 205, 305 and a PTT button 106, 206, 306. Each of the mobile telephones 102, 202, 302 comprises a first communication module 107, 207, 307, wherein the first communication module 107, 207, 307 is designed such that there is a wireless first communication connection 108, 208, 308 to a mobile radio network 2 which is in the form of an LTE network 3. First communication A, therefore, takes place via the mobile radio network 2 which is symbolized by three antennas 2a, 2b, 2c.

Each of the mobile telephones 102, 202, 302 comprises a second communication module 109, 209, 309 and each of the additional devices 103, 203, 303 comprises a first communication module 110, 210, 310. The second communication modules 109, 209, 309 of the mobile telephones 102, 202, 302 and the first communication modules 110, 210, 310 of the additional devices 103, 203, 303 are designed such that there is in each case a wireless second communication connection B 111, 211, 311 between the mobile telephone 102 and the additional device 103 and between the mobile telephone 202 and the additional device 203 and between the mobile telephone 302 and the additional device 303. Alternatively, instead of the wireless second communication connection, a wired second communication connection is also provided. Both the wireless communication connection and the wired communication connection make it possible for the mobile terminals to each be in the form of two-part devices, with the result that they are better suited to being worn on the body. Second communication B is, therefore, respectively carried out between the mobile telephone 102, 202, 302 and the respectively associated additional device 103, 203, 303.

Furthermore, each of the additional devices 103, 203, 303 comprises a second communication module 112, 212, 312. In this case, the second communication modules 112, 212, 312 are each designed such that they each have, as participants 113, 213, 313 of a WLAN network 4, a wireless third communication connection 114, 214, 314 to this WLAN network 4. Third communication C, therefore, takes place between the additional devices 103, 203, 303 via the WLAN network 4.

The method according to the present invention for setting up a communication group KG in a direct mode, into which the subgroup 1 of mobile terminals 101, 201, 301 from a group of mobile terminals is incorporated, comprises the steps of:

generating a data set in one of the mobile terminals 101, 201, 301 in the subgroup 1, which is suitable for setting up a WLAN network, wherein the data set comprises a network name for the WLAN network 4 to be set up, and wherein the data set comprises specific data relating to use, such as, in particular, a use identifier, transmitting the data set from the first communication module 107, 207, 307 of the mobile telephone 102, 202, 302 to an operations center 5 via the mobile radio network 2, 3, transmitting network accession commands and the network name from the operations center 5 to the first communication modules of the mobile telephones 102, 202, 302 of the mobile terminals 101, 201, 301 of the members of the subgroup 1 defined by the use identifier, further transmitting the network accession commands and the network name from the respective second communication module 109, 209, 309 of the mobile telephones 102, 202, 302 to the respective first communication modules 110, 210, 310 of the additional devices 103, 203, 303, further transmitting the network accession commands and the network name from the respective first communication modules 110, 210, 310 of the additional devices 103, 203, 303 to the respective second communication modules 112, 212, 312 of the additional devices 103, 203, 303, activating and establishing the respective second communication modules 112, 212, 312 of the additional devices 103, 203, 303 as participants 113, 213, 313 of the WLAN network 4 by means of the received network name, and participating in third communication C in the WLAN network 4.

FIG. 2 again shows the mobile terminals 101, 201, 301 known from FIG. 1. In this respect, reference is made to the description of FIG. 1. According to the embodiment variant shown in FIG. 2, the subgroup 1 which comprises these three mobile terminals 101, 201, 301 comprises an additional mobile telephone 402 as a further member of the subgroup 1. As a result of this additional mobile telephone 402, the subgroup 1 is optionally expanded by one participant 413. In addition to a first communication module 407, the additional mobile telephone 402 comprises a WLAN communication module 416 which is used to incorporate the additional mobile telephone 402 into the WLAN network 4 in such a manner that this additional mobile telephone participates in the third communication C established via the third communication connections 114, 214, 314 of the mobile terminals 101, 201, 301 via a wireless third communication connection 414.

The additional mobile telephone 402 receives information relating to the incorporation into the WLAN network 4 from the operations center 5, for example, via the mobile radio network 2, to which the additional mobile telephone 402 is connected by way of a first communication module 407 via a first communication connection 408.

Figure 2:
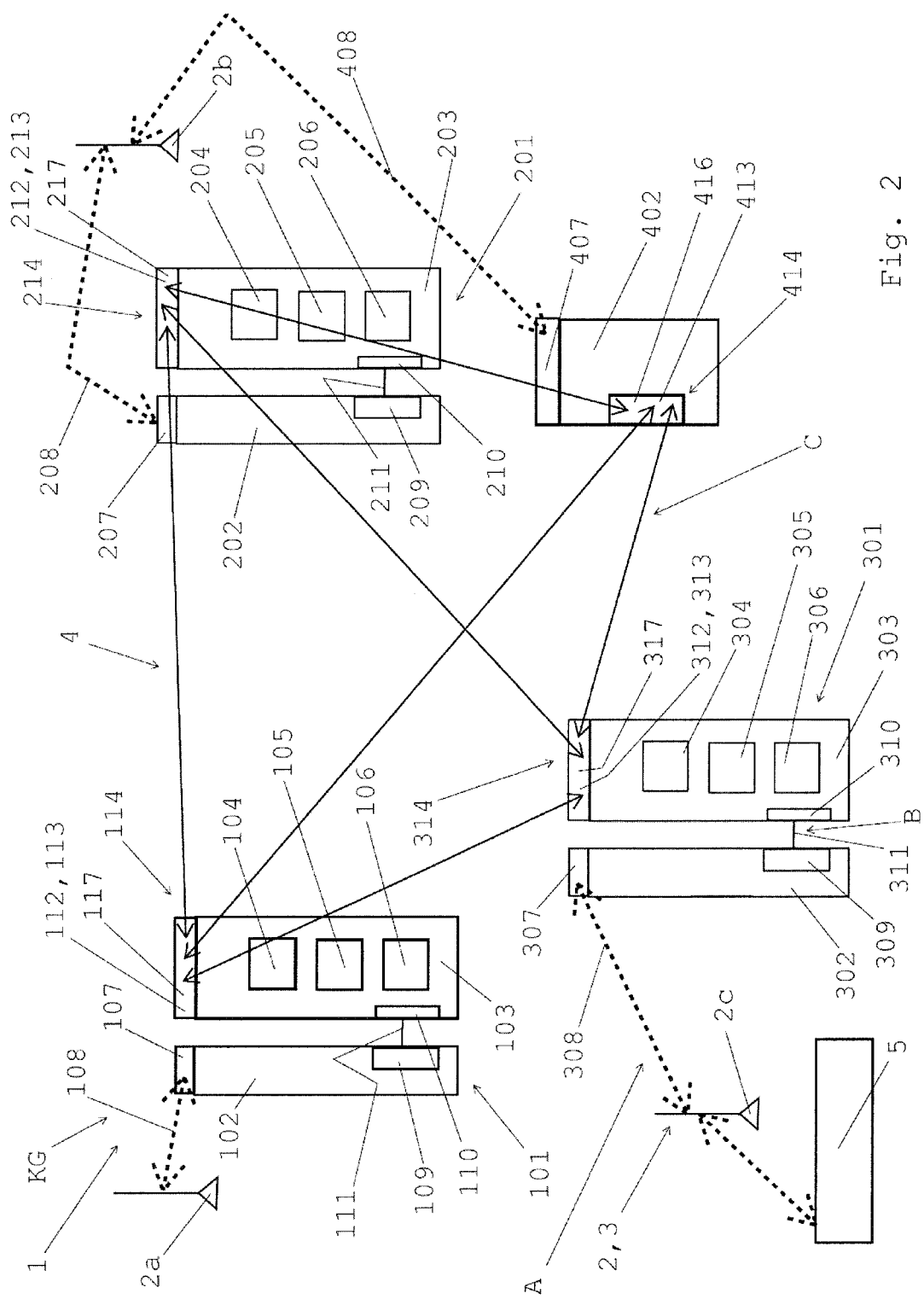
FIG. 2 again shows the schematic illustration of the subgroup according to the present invention of three mobile terminals which is known from FIG. 1, wherein this subgroup is supplemented with an optionally present, additional mobile telephone.

The subgroup 1 expanded by the mobile telephone 402 and shown in FIG. 2 can be expanded by further participants designed according to the mobile terminals 102, 202, 303 and/or by further participants designed according to the additional mobile telephone 402.

In principle, it is also stated that it has already been conventional practice since the use of analog transmission technologies to carry out voice communication by means of a simple accessory, a combination of a loudspeaker, a microphone and a push-to-talk button, which is worn on the shoulder or the upper body. In the case of the mobile terminals according to the present invention as well, such an accessory is used, together with modern digital mobile telephones, as an additional device and is connected to the mobile telephone in a wired or wireless manner, for example by means of Bluetooth.

In order to establish direct group communication, in particular, group communication which is independent of an LTE network, in a subgroup, such an accessory or additional device of the mobile terminal is not only equipped according to the present invention with the first communication module for connection to the second communication module of the mobile telephone of the mobile terminal, but rather it also comprises the second communication module as an additional device of the mobile terminal, with the result that it is possible to set up an ad hoc network for group communication based on a place of use in a subgroup. WLAN networks are suitable for this purpose since, as a result of the mesh functionality present in these networks, group communication in a subgroup is possible at a place of use without relays or repeaters.

First communication takes place, for example, between the mobile telephone of the mobile terminal and an operations center in an LTE network. Second communication takes place between the mobile telephone of the mobile terminal and the additional device of the mobile terminal in a wireless or wired manner, with the result that the additional device can be used for convenient communication via the mobile telephone.

Since the additional device of the mobile terminal is equipped with a further, second communication module, further, third communication which is independent of a mobile radio network can take place in a so-called direct mode as group communication in a subgroup based on use.

In order to prepare for the direct mode, the second communication between the mobile telephone of the mobile terminal and the additional device of the mobile terminal is used to transmit specific data relating to the additional device to the center, for example, via the mobile telephone so that the center can initiate third communication conducted in the direct mode in a subgroup. For this purpose, the other mobile terminals which are intended to belong to the subgroup are accordingly informed by the center via the mobile radio network.

LIST OF REFERENCE SIGNS

1 Subgroup
2 Mobile radio network
2a, 2b, 2c Antenna of 2
3 LTE network
4 WLAN network
5 Operations center
101, 201, 301 Mobile terminal
102, 202, 302 Mobile telephone
103, 203, 303 Additional device
104, 204, 304 Loudspeaker
105, 205, 305 Microphone
106, 206, 306 PTT button
107, 207, 307 First communication module of 102, 202, 302
108, 208, 308 First communication connection
109, 209, 309 Second communication module of 102, 202, 302
110, 210, 310 First communication module of 103, 203, 303
111, 211, 311 Second communication connection
112, 212, 312 Second communication module of 103, 203, 303
113, 213, 313 Participant in the WLAN network 3
114, 214, 314 Third communication connection
402 Additional mobile telephone
407 First communication module of 402
408 First communication connection
413 Participant
414 Third communication connection
416 WLAN communication module
A, B, C First/second/third communication
KG Communication group

The invention claimed is:

1. A subgroup of mobile terminals, members of the subgroup of mobile terminals comprising a first mobile terminal and at least one second mobile terminal,
wherein each mobile terminal comprises a mobile telephone, an additional device and both a first communication module of a mobile telephone and a wireless local area network (WLAN) communication module,
wherein each additional device comprises a loudspeaker, a microphone and a PTT button,
wherein the first communication module of the mobile telephone is designed such that a wireless first communication connection to at least one mobile radio network is enabled,
wherein each mobile telephone comprises the first communication module of the mobile telephone and a second communication module,
wherein each additional device comprises a first communication module, and the WLAN communication module,
wherein the second communication module of the mobile telephone and the first communication module of the additional device are each configured to establish a direct second communication connection between the respective mobile telephone and the respective additional device, and
wherein each of the WLAN communication modules of the members of the group of mobile terminals is configured to establish a direct group third communication connection via a wireless WLAN network therebetween, which is independent from the wireless first communication connection, such that each member of the subgroup of mobile terminals is a direct mode participant in the direct group third communication connection via the WLAN network.

2. The subgroup of mobile terminals according to claim 1, wherein the (WLAN) communication module of the additional device is respectively designed such that it has routing capabilities and/or repeater capabilities and/or bridging capabilities.

3. The subgroup of mobile terminals according to claim 1, wherein the members of the subgroup of mobile terminals further comprise at least one additional mobile telephone, wherein, each additional mobile telephone comprises both a first communication module of a mobile telephone and a WLAN communication module, and wherein the WLAN communication module in each additional mobile telephone is configured to establish the direct group third communication connection via the WLAN network, such that each additional mobile telephone is a further direct mode participant in the direct group third communication connection via the WLAN network.

4. A method for setting up a communication group in a direct mode, into which a subgroup of mobile terminals from a group of mobile terminals is incorporated, the communication group comprising the subgroup of mobile terminals according to claim 1, the method comprising the steps of:
generating a data set in one of the mobile terminals in the subgroup, which is suitable for setting up a WLAN network, wherein the data set comprises a network name for the WLAN network to be set up, and wherein the data set comprises specific data relating to use, such as a use identifier,
transmitting the data set from the first communication module of the mobile telephone to an operations center via the mobile radio network,
transmitting network accession commands and the network name from the operations center to the first communication modules of the mobile telephones of the mobile terminals of the members of the subgroup defined by the use identifier,
further transmitting the network accession commands and the network name from the respective second communication module of the mobile telephones to the respective first communication modules of the additional devices,
further transmitting the network accession commands and the network name from the respective first communication modules of the additional devices to the respective WLAN communication modules of the additional devices, activating and establishing the respective WLAN communication modules of the additional devices as participants of the WLAN network by means of the received network name, and participating in the direct group third communication connection in the WLAN network.

5. The method according to claim 4, wherein, before participating in the direct group third communication connection in the WLAN network, participation of the mobile terminal is confirmed within a time window by pressing a button.

6. The method according to claim 4, wherein the direct group third communication connection of the subgroup, which takes place in the WLAN network, is transmitted to the operations center via at least one of the mobile terminals.

7. The method according claim 4, wherein an incoming call on one of the mobile telephones in the subgroup is signaled in the WLAN network and, if this call is accepted for the subgroup, is transmitted to the subgroup in such a manner that either a listen connection or a speak connection or a listen/speak connection is enabled for all participants in the subgroup.

8. The method according to claim 4, wherein the subgroup is expanded by at least one additional mobile telephone, wherein each additional mobile telephone comprises both a first communication module of a mobile telephone and a WLAN communication module, the WLAN communication module is used to incorporate the additional mobile telephone into the WLAN network in such a manner that the direct group third communication connection to the WLAN network is activated and established for this additional mobile telephone as an additional direct mode participant of the WLAN network.

9. The method according to claim 8, wherein, if the first communication connection fails for one member of the subgroup or for all members of the subgroup, communication is carried out directly in the subgroup only via the direct group third communication connection and the WLAN communication modules of the additional devices and also the WLAN communication module of the at least one additional mobile telephone are activated for this purpose.

\* \* \* \* \*